W. C. GOULD.
Nut-Lock.

No. 161,949. Patented April 13, 1875.

WITNESSES.
Tappen Townsend
D. S. Cooke

INVENTOR
William C Gould

THE GRAPHIC CO.PHOTO-LITH.39 & 41 PARK PLACE,N.Y.

UNITED STATES PATENT OFFICE.

WILLIAM C. GOULD, OF NEW YORK, N. Y.

IMPROVEMENT IN NUT-LOCKS.

Specification forming part of Letters Patent No. 161,949, dated April 13, 1875; application filed August 11, 1874.

*To all whom it may concern:*

Be it known that I, WILLIAM C. GOULD, of the city, county, and State of New York, have invented certain new and useful improvements for securing and locking nuts in position after being screwed on the ends of bolts, of which the following is a specification:

My invention relates to holding bolt-nuts to their place at any desired point when being wrenched; and consists of one or more recesses, in which may be inserted one or more plates, each of which contain one or more lugs or points, over which the corners of the nuts will slide, and as each point is passed it can be turned up behind the corner of the nut, either by spring or mechanical force, and thus prevent the nut from turning back.

Figure 1:
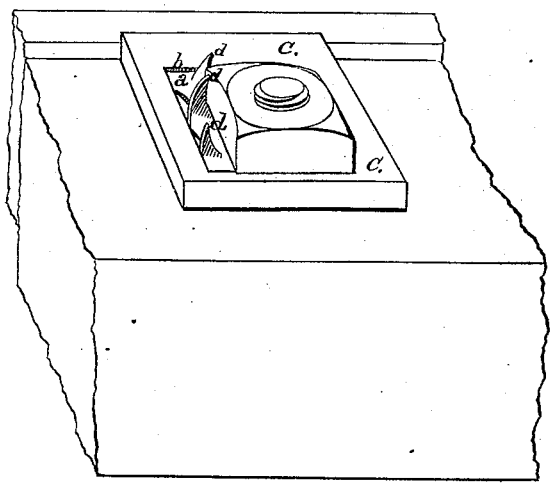
Figure 2:
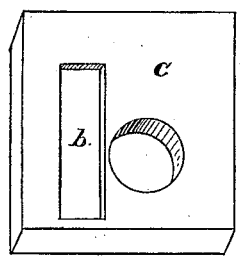
Figure 3:
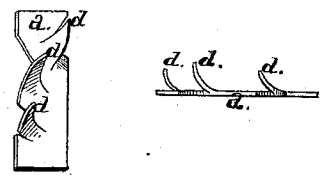

In the accompanying drawing, Figure 1 represents a top view of my nut-lock, with the several parts in position, as when locked by plate *a* in a recess made in a washer, *c*. Fig. 2 represents a cast-iron washer, *c*, with a recess, *b*, for the reception of the plate *a*. Fig. 3 represents plate *a* in perspective and elevated views, showing the points *d*, which hold the nut in position.

In most cases some kind of washer may be necessary, which may be made of any suitable material; but probably cast-iron will, in most cases, prove to be the most economical and durable. The washer must, of course, have either points or projections to keep it from turning round.

Although the plates may be made of any material, if of sufficient strength, tempered sheet-brass will doubtless keep its temper longer, and be less liable to rust, than either iron or steel plate.

Having described my invention, I claim—

The combination of the washer *c*, having the recess *b*, with the locking-plate *a*, slitted and turned up, as shown at *d*, for locking a nut at several points of its revolution, substantially as described.

In testimony whereof I have hereunto signed my name this 16th day of July, 1874.

WILLIAM C. GOULD.

Witnesses:
TAPPAN TOWNSEND,
B. S. COOK.